United States Patent [19]
Kawana

[11] Patent Number: 5,010,237
[45] Date of Patent: Apr. 23, 1991

[54] IC CARD SYSTEM FOR PREVENTING UNAUTHORIZED DATA ALTERATION

[75] Inventor: Shigeyuki Kawana, Tokyo, Japan
[73] Assignee: Casio Computer Co., Ltd., Tokyo, Japan
[21] Appl. No.: 178,237
[22] Filed: Apr. 6, 1988
[30] Foreign Application Priority Data Apr. 10, 1987 [JP] Japan .............................. 62-87070
Jul. 24, 1987 [JP] Japan ......................... 62-112703[U]

[51] Int. Cl.⁵ .............................................. G06F 15/30
[52] U.S. Cl. .................................... 235/379; 235/441; 235/492
[58] Field of Search ................ 235/380, 441, 492, 379

[56] References Cited
U.S. PATENT DOCUMENTS 4,211,919 7/1980 Ugon .
4,614,861 9/1986 Pavlov et al. .
4,816,653 3/1989 Anderl et al. ........................ 235/380

OTHER PUBLICATIONS

IBM Technical Disclosure Bulletin, vol. 30, No. 3, Aug. 3, 1987, pp. 1262–1265, Armonk, N.Y., U.S.; "Personal transaction card".

Primary Examiner—David Trafton
Attorney, Agent, or Firm—Frishauf, Holtz, Goodman & Woodward

[57] ABSTRACT

An IC card internally stores two different PINs. Collation of these PINs sets the IC card having an internal data memory in different characterizing statuses. When coincidence occurs at the first PIN collation, data input to the data memory of the card is permitted. When coincidence occurs at the second PIN collation, data transfer is permitted. Accordingly, when important data is stored in the IC card and a plurality of persons handle the IC card, the data stored in the IC card can be prevented from being altered unauthorized.

15 Claims, 12 Drawing Sheets

FIG. 2

| NO. | ITEM | CONTENT |
|---|---|---|
| 1 | COMPANY NAME | |
| 2 | REPRESENTATIVE NAME | |
| 3 | ADDRESS | |
| 4 | TELEPHONE NUMBER | |
| 5 | BANK NUMBER | |
| 6 | BRANCH NUMBER | |
| 7 | DEPOSIT TYPE | |
| 8 | ACCOUNT NUMBER | |
| 9 | ACCOUNT NAME | |
| 10 | COMPANY NAME | |
| 11 | DESIGNATED TRANSFER DATE | |
| 12 | SUPERVISOR PIN | |
| 13 | MANAGER PIN | |
| 14 | PERSON-IN-CHARGE PIN | |

FIG. 3

| REGISTERED NUMBER | RECEIVER | BANK NUMBER | BRANCH NUMBER | ACCOUNT NUMBER | DEPOSIT TYPE |
|---|---|---|---|---|---|
| 001 | XX CO. | 0001 | 211 | 123456 | 01 |
| 002 | XX BUILDING OFFICE | 0004 | 214 | 789012 | 01 |
| 003 | XX LEASE CO. | 0002 | 219 | 345678 | 02 |
| 004 | XX SHOP | 0010 | 100 | 901234 | 01 |
| 005 | XX CO. | 0020 | 121 | 567890 | 02 |
| 006 | XX LEASE CO. | 0050 | 130 | 234567 | 02 |
| 007 | XX SHOP | 0030 | 150 | 890123 | 02 |
| 008 | XX SHOP | 0003 | 211 | 456789 | 01 |
| 009 | XX FINANCE CO. | 0005 | 215 | 012345 | 01 |
| | | | | | |
| | | | | | |
| | | | | | |
| | | | | | |
| 199 | | | | | |
| 200 | | | | | |

| NUMBER | BANK NUMBER | BRANCH NUMBER | DEPOSIT | RECEIVER | ACCOUNT NUMBER | AMOUNT |
|---|---|---|---|---|---|---|
| 001 | 0001 | 214 | 01 | XX CO. | 123456 | 1000000 |
| 002 | 0001 | 211 | 01 | XX BUILDING OFFICE | 789012 | 1500000 |
| 003 | 0002 | 219 | 02 | XX LEASE CO. | 345678 | 10000000 |
| 004 | 0010 | 100 | 01 | XX SHOP | 901234 | 35000000 |
| 005 | 0020 | 121 | 02 | XX CO. | 567890 | 8000000 |
| 006 | 0050 | 130 | 02 | XX LEASE CO. | 234567 | 900000 |
| 007 | 0030 | 150 | 02 | XX SHOP | 890123 | 20000000 |
| 008 | 0003 | 211 | 01 | XX SHOP | 456789 | 200000 |
| 009 | 0005 | 215 | 01 | XX FINANCE CO. | 012345 | 5000000 |

FIG. 4

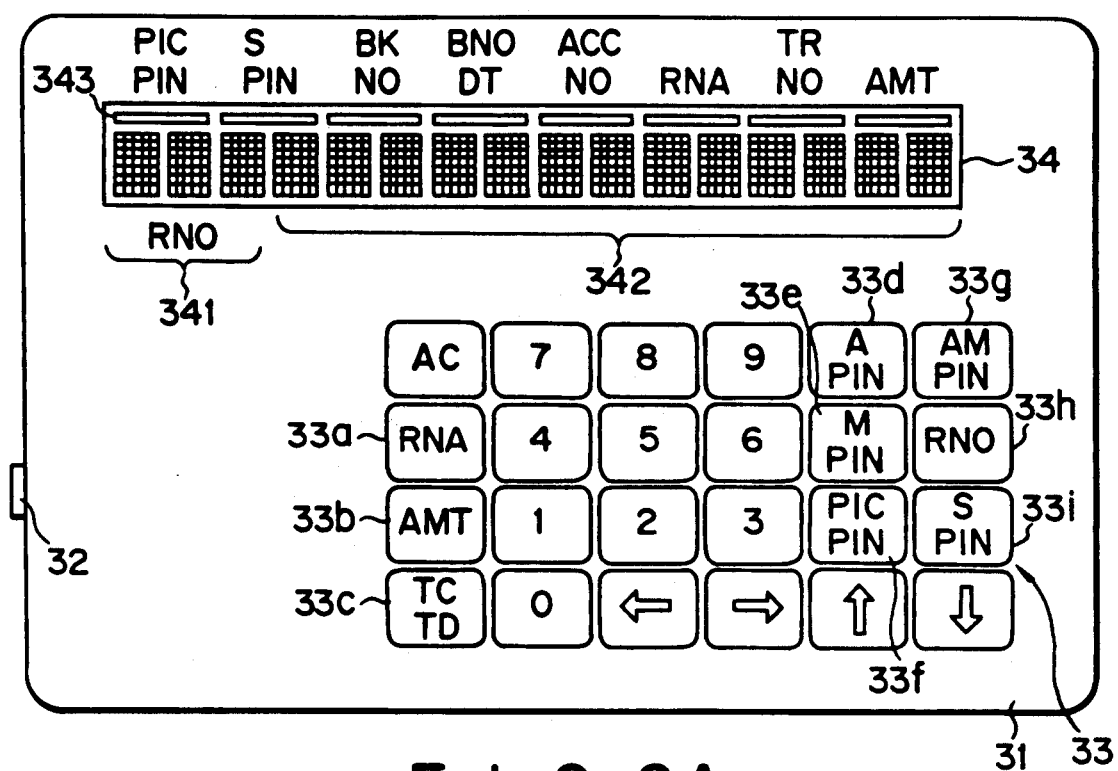
F I G. 6A
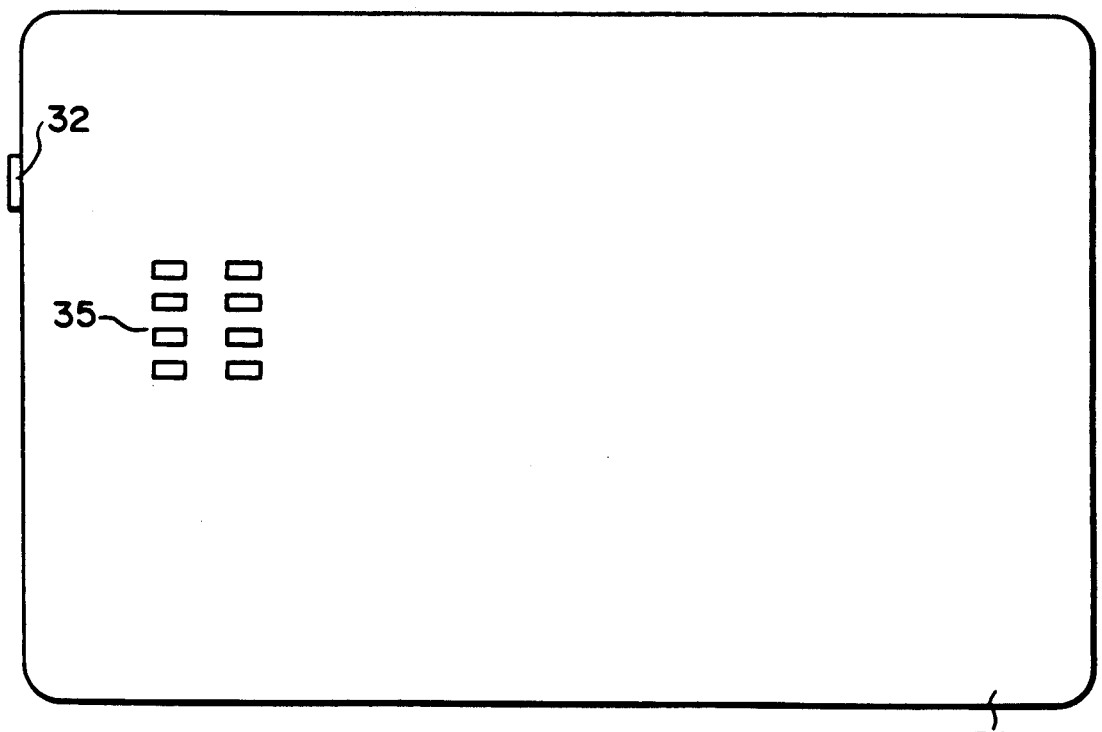
F I G. 6B

| OPERATION LEVEL | DATA READOUT FROM CARD | DATA WRITING IN CARD | TRANSMISSION TO CENTER |
|---|---|---|---|
| a PERSON-IN-CHARGE | ○ | ○ | × |
| b MANAGER | ○ | × | × |
| c SUPERVISOR | × | × | ○ |

FIG. 10

| SRA | BL | CLS | COD | STS | DATA | BCC |
|---|---|---|---|---|---|---|

START CODE | BLOCK LENGTH | CLASS | COMMAND CODE | STATUS | REGISTERED NUMBER, BANK NUMBER, CHECK BRANCH NUMBER, DEPOSIT TYPE, CODE ACCOUNT NUMBER, RECEIVER NAME, TRANSACTION NUMBER, AMOUNT

FIG. 11

IC CARD SYSTEM FOR PREVENTING UNAUTHORIZED DATA ALTERATION

BACKGROUND OF THE INVENTION

1. Field of the Invention

The present invention relates to an IC card system for performing the collation of a personal identification number (PIN) through a plurality of steps in data processing using an IC card.

2. Description of the Related Art

Today, it is the so-called cash-less age, and it is possible to purchase commodities without paying cash, but using cards issued by credit card companies, etc.

Conventionally-available cards include plastic cards, embossed cards and magnetic stripe cards, which are structurally easy to forge and hence raise the problem of unauthorized use.

As a solution to such a problem, it has been proposed to use information-carrying cards, so-called IC cards, which store information such as personal identification numbers.

In such IC cards, a personal identification number (PIN) is used as a key to access internal data, and an externally input PIN is collated with a PIN prestored in the cards and access to the internal data is permitted when they coincide with each other.

Generally, however, only one PIN is used to permit such data access, so that in the case where important data written in an IC card needs to be checked by a plurality of persons, the individual checkers should read out the internal data with the same PIN for the checking operation. This does not make it possible to perform the checking operation in the correct sequence unless the order of the persons to check the data is determined in advance and the flow of the card is monitored according to the order. As a solution to this problem, the internal data of the IC card may be printed out and the print-out may be circulated for the checking operation. With this method, however, the internal data of the IC card is relatively easy to alter.

This is the bottleneck in realizing a firm banking or home banking system, which has recently been proposed as one application of IC cards and executes various types of data processing for, for example, bank transactions, using IC cards. This is because it is difficult to provide a system for performing the responsible checking operation in the individual checking stages, permitting easy alteration of the data and thus significantly deteriorating the reliability and the security of IC cards.

SUMMARY OF THE INVENTION

It is therefore an object of this invention to provide an IC card system which can check data necessary for initiating in firm banking, etc. when it is written into or read out from an IC card device, thus making it impossible to alter the data unauthorized.

According to this invention, there is provided an IC card system having an IC card and a terminal used in association with the IC card, which system comprises:

an IC card having means for storing at least two different personal identification numbers, collation means for performing personal identification number (PIN) collation, data memory means and control means for controlling data access to the IC card;

first PIN data input means for inputting first PIN data to be collated with a first PIN stored in said storing means by the collation means of the IC card;

second PIN data input means for inputting second PIN data to be collated with a second PIN stored in said storing means by the collation means of the IC card;

data input means for inputting data to the memory means of the IC card; and a terminal unit having readout means for reading out data from the IC card and sending the read-out data to computing means coupled thereto, wherein the control means of the IC card permit to write the data from the data input means to the IC card when the first inputted PIN data coincides with the first stored PIN and permit to transfer the data written in the IC card to a computing unit from the terminal unit when the second inputted PIN data coincides with the stored second PIN.

BRIEF DESCRIPTION OF THE DRAWINGS

FIG. 2 is a diagram illustrating an application for an IC card used in this embodiment;

FIG. 3 is a diagram illustrating a transfer destination list used in the embodiment;

FIG. 4 is a diagram illustrating a remittance list used in the embodiment;

FIGS. 6A and 6B show a perspective view of an IC card used in the embodiment;

FIG. 10 is a diagram for explaining the functions of the IC card in the individual stages; and FIG. 11 is a diagram illustrating the format of transfer data used in the embodiment.

DETAILED DESCRIPTION OF THE PREFERRED EMBODIMENT

An embodiment of this invention will now be explained referring to the accompanying drawings.

Figure 1:
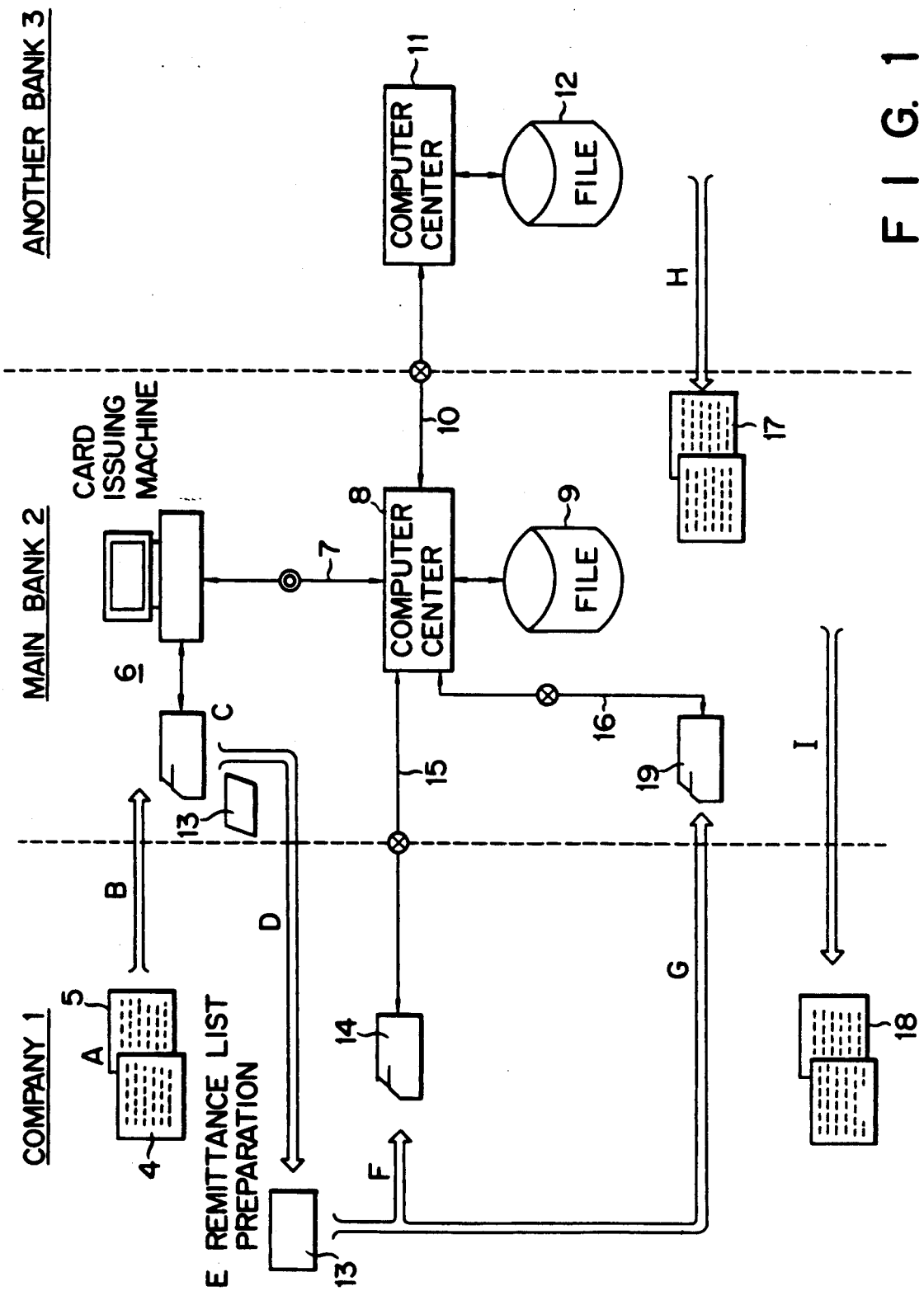
FIG. 1 is a diagram for explaining a firm banking system to which one embodiment of this invention is applied.

FIG. 1 illustrates a firm banking system between a company and banks, which embodies this invention. This system is constituted by a company 1, a main bank 2 and another bank 3. To begin with, an application 4 for an IC card and a transfer destination list 5 are prepared by company 1 at step A in FIG. 1. As shown in FIG. 2, IC card application 4 contains information such as "company name," "representative name," "address," "telephone number," "bank number," "branch number," "deposit type," "account number," "account name," "company name (company code)," "designated transfer date," "supervisor PIN," "manager PIN" and "person-in-charge PIN." Transfer destination list 5 contains information such as "registered number," "receiver," "bank number," "branch number," "account number" and "deposit type" for each receiver, as shown in FIG. 3. The "registered number" is a 3-digit figure given for each transfer destination, i.e., each receiver. The "bank number" is a figure specifically assigned to each bank by the bank association, and the "branch number" is a figure specified for each branch by the associated bank. The "deposit type" is generally a code corresponding to the type of an account, such as a general account and a checking account; in this example, "01" represents the general account and "02" represents the checking account.

IC card application 4 and transfer destination list 5 are sent to main bank 2 by the route B in FIG. 1; they may be delivered to main bank 2 by mail or directly.

Main bank 2 issues a requested IC card 13 at step C. In this case, the contents of IC card application 4 and transfer destination list 5 sent from company 1 are entered into a card issuing machine 6. The various input data is sent through a private line 7 to a computer center 8 from card issuing machine 6 and is written in a file 9. Computer center 8 is coupled through a public line 10 to a computer center 11 of another bank 3, so that the various input data from card issuing machine 6 is also sent to this computer center 11 and is written in a file 12.

IC card 13 thus issued from card issuing machine 6 stores information of the individual items as shown in FIG. 4, "registered number," "bank number," "branch number," "deposit type," "receiver," "account number" and "amount," as a remittance list. With regard to the first five items, "registered number," "bank number," "branch number," "deposit type," "receiver" and "account number," data is written on the IC card based on the remittance list, but the last item "amount" is left blank. IC card 13 also stores the "supervisor PIN," "manager PIN" and "person-in-charge PIN" of IC card application 4.

IC card 13 is delivered to company 1 by route D as shown in FIG. 1. At the step E, the remittance list involving IC card 13 is prepared. In this case, a transfer date is input together with the amount data for the item "amount" of the remittance list (its detailed description will be given later).

IC card 13, whose remittance list has been prepared, is loaded into a terminal 14 owned by company 1 itself by route F or into a terminal 19 owned by main bank 2 by route G. The data of the remittance list is sent to computer center 8 from terminal 14 or 19 over a public line 15 or 16. At this time, if the contents of the remittance list are directed to main bank 2, data processing is performed in computer center 8; on the other hand, if the contents are directed to another bank 3, data processing is done in computer center 11. Upon completion of the data processing, a transfer list 17 is sent to main bank 2 from another bank 3 by route H. Then, a remittance list 18 having the contents of transfer list 17 added thereto is prepared in main bank 2 and is sent to company 1 by route I. The remittance list 18 may be printed out through terminal 14 or 19.

Figure 5:
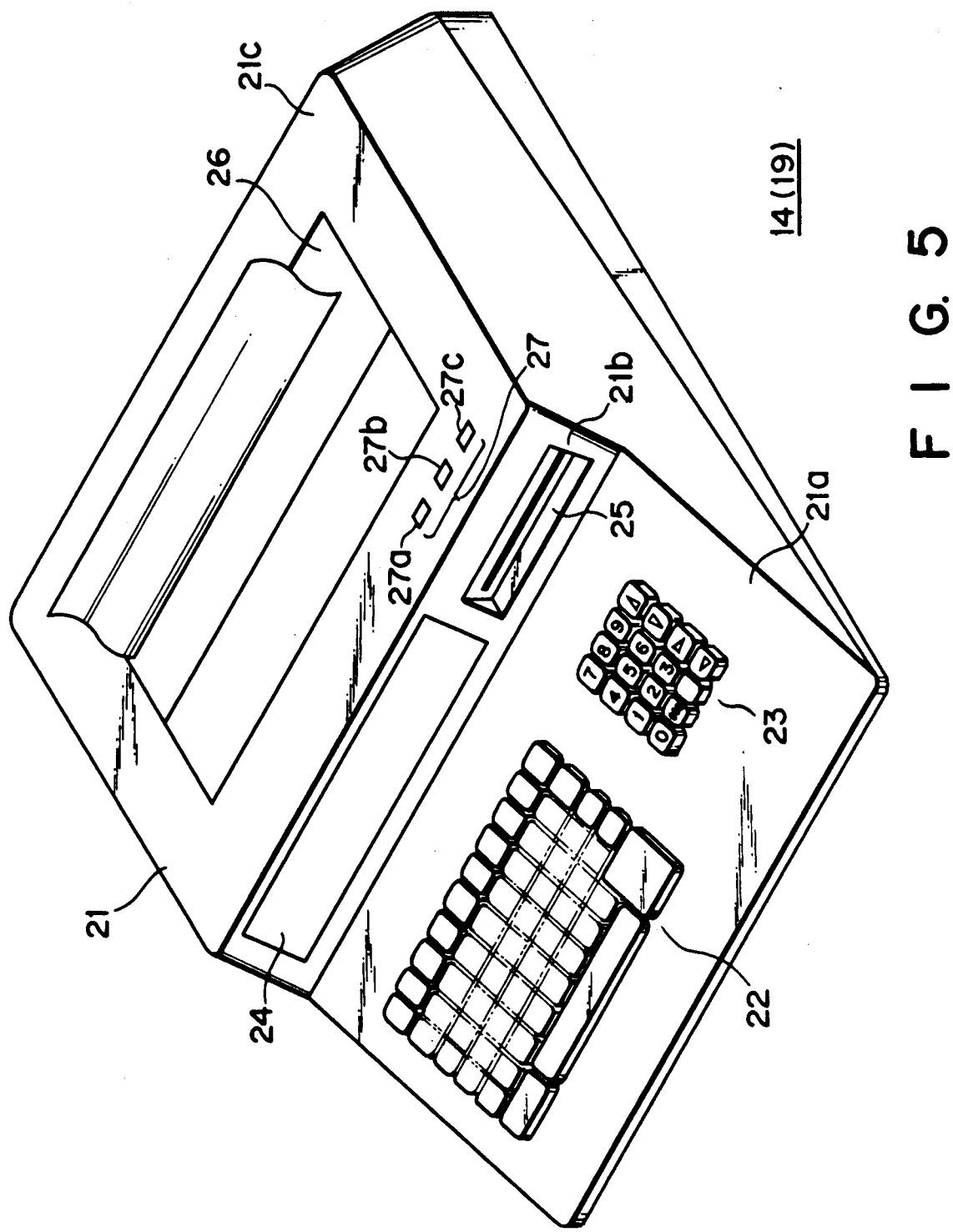
FIG. 5 is a perspective view of a terminal used in the embodiment.

FIG. 5 gives a perspective view of terminal 14 (or 19) used in the above system. In the figure, reference numeral 21 is a terminal body having an inclined surface 21a on which two keyboards 22 and 23 are provided. Keyboard 22 has alphabet keys from "A" to "Z", "." key, "CAPS LOCK" key, "SPACE" key and "ENTER" key, while keyboard 23 has numeral keys from "0" to "9", "000" key, "." key, " ↑ " key, " ↓ " key, "→" key and "Λ" key. At the rear section of inclined surface 21a lies a rising section 21b, which sharply rises from the surface and has a liquid crystal display 24 and a card slot 25 provided thereon. Terminal body 21 further has a horizontal top section 21c continuous from rising section 21b and a printer section 26 provided in the top section 21c.

On top section 21c is an indicator 27 which includes a power lamp 27a for indicating power ON, a card lamp 27b for indicating a card in use and a communication lamp 27c for indicating data communication in process.

FIGS. 6A and 6B illustrate IC card 13 adapted to be loaded to such terminal 14 or 19. In the figure, reference numeral 31 is an IC card body having an IC circuit and a power source built therein. IC card body 31 has a power switch 32 on its side and a keyboard 33 and a liquid crystal display 34 on its top. Keyboard 33 has an "AC" key, "RECEIVER NAME" key 33a, "AMOUNT" key 33b, "TOTAL.CASE QUANTITY/TRANSFER DATE" key 33c, numeral keys from "0" to "9," "ALTERATION PIN"key 33d, "ALTERATION MANAGEMENT PIN" key 33g, "REGISTERED NUMBER"key 33h, "SUPERVISOR PIN" key 33i, "MANAGER PIN"key 33e, "PERSON-IN-CHARGE PIN" key 33f, "←" key, "→" key, " ↑ " key and " ↓ " key. The "RECEIVER NAME" key 33a is operated to display a receiver name. The "AMOUNT" key 33b is operated to display an amount. The "TOTAL.CASE QUANTITY/TRANSFER DATE" key 33c is operated to display a total, the number of cases and a transfer date. The "REGISTERED NUMBER" key 33h is operated to enter a registered number. The "SUPERVISOR PIN" key 33i is operated to enter a supervisor PIN, the "MANAGER PIN" key 33e is operated to enter a manager PIN and the "PERSON-IN-CHARGE PIN" key 33f is operated to enter a person-in-charge PIN.

Liquid crystal display 34 has a registered-number (RNO) display section 341, a data display section 342 and a symbol display section 343 for indicating the individual items "person-in-charge PIN (PICPIN)," "supervisor PIN (SPIN)," "bank number (BKNO)," "branch number/deposit type (BNODT)," "account number (ACCNO)," "receiver name (RNA)," "transaction number (TRNO)" and "amount (AMT)."

On the back of IC card body 31 is an external-connection contact 35 adapted to be coupled to the aforementioned terminal 14 or 19. This contact 35 comprises eight pins (2×4).

Figure 7A:
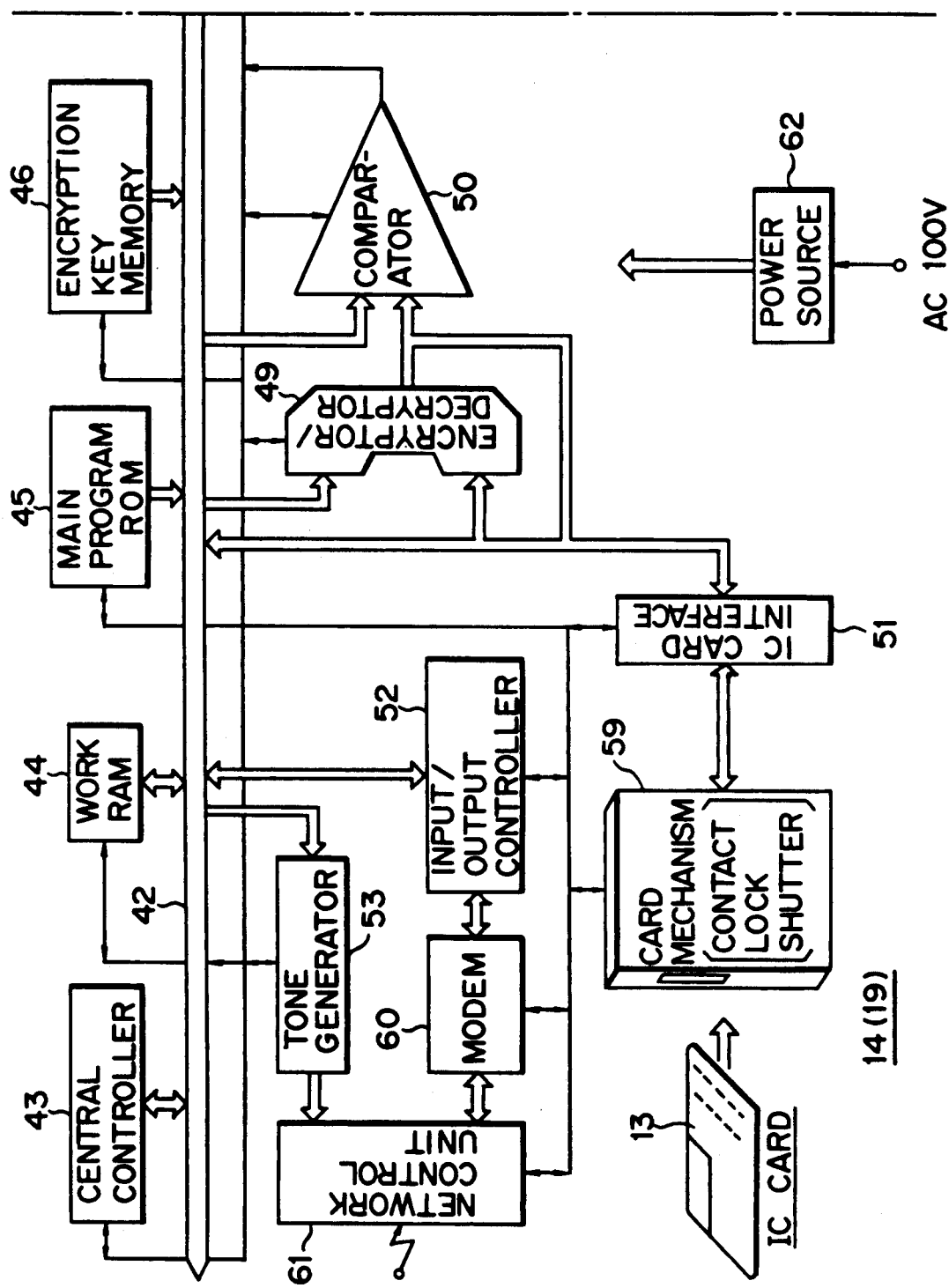
FIGS. 7A and 7B show a block diagram illustrating the circuit arrangement of the terminal.
Figure 7B:
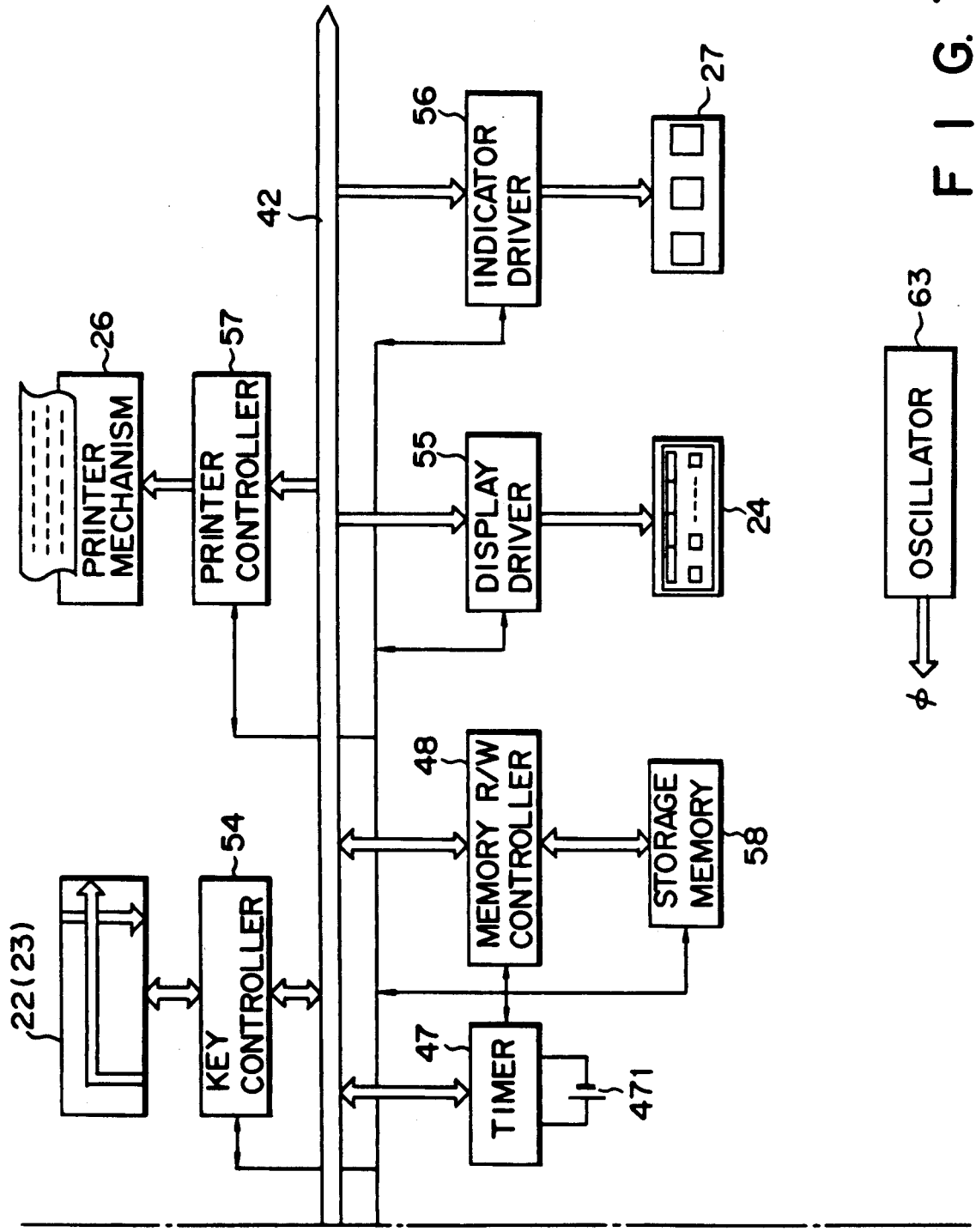

FIGS. 7A and 7B illustrate the circuit arrangement of terminals 14 and 19. In the figure, reference numeral 42 is a system bus to which a central controller 43, a work RAM 44, a main program ROM 45, an encryption key memory 46, a timer 47, memory R/W (read/write) controller 48, a decryptor 49, a comparator 50, an IC card interface 51, an input/output controller 52, a tone generator 53, a key controller 54, a display driver 55, an indicator driver 56 and a printer controller 57 are coupled.

Central controller 43 sends control signals to the individual circuits in accordance with the system operational status. Work RAM 44 stores each code sent from IC card 13 as well as various processing data produced in terminals 14 and 19. Main program ROM 45 stores various system programs and a code TCN, exclusive for the terminal, which is used for authentication of an IC card. Encryption key memory 46 stores an encryption key which is used in decryptor 49 for decryption and encryption. Timer 47 measures the time and presents current date and time, and is coupled to a backup power source 471 for that purpose. Memory R/W controller 48 controls write and read access to a storage memory 58 in response to a command from central controller 43. Comparator 50 compares data decrypted by decryptor 49 with data from work RAM 44 or main program ROM 45, and sends the comparison result to central controller 43. IC card interface 51 receives data from IC card 13 as well as sends data encrypted by decryptor 49 to IC card 13. This IC card interface 51 is coupled to a card mechanism 59, to which IC card 13 is loaded and which has a contact, a lock and a shutter. Input/output controller 52 controls data input/output with respect to public lines and is coupled to a network control unit 61 through a modem 60. Tone generator 53 automatically produces a dial signal for calling a center through network control unit 61. Key controller 54 supplies sampling signals to keyboards 22 and 23 of terminal 14 or 19 to detect a key input. Display driver 55 controls the display operation of the aforementioned liquid display 24. Indicator driver 56 controls the display operation of indicator 27. Printer controller 57 controls the printing operation of printer 26.

Reference numeral 62 is a power source which generates driving voltages for the individual circuits from a commercially-available 100 V, and reference numeral 63 is an oscillator which generates a system clock $\phi$ supplied to the individual circuits.

Figure 8:
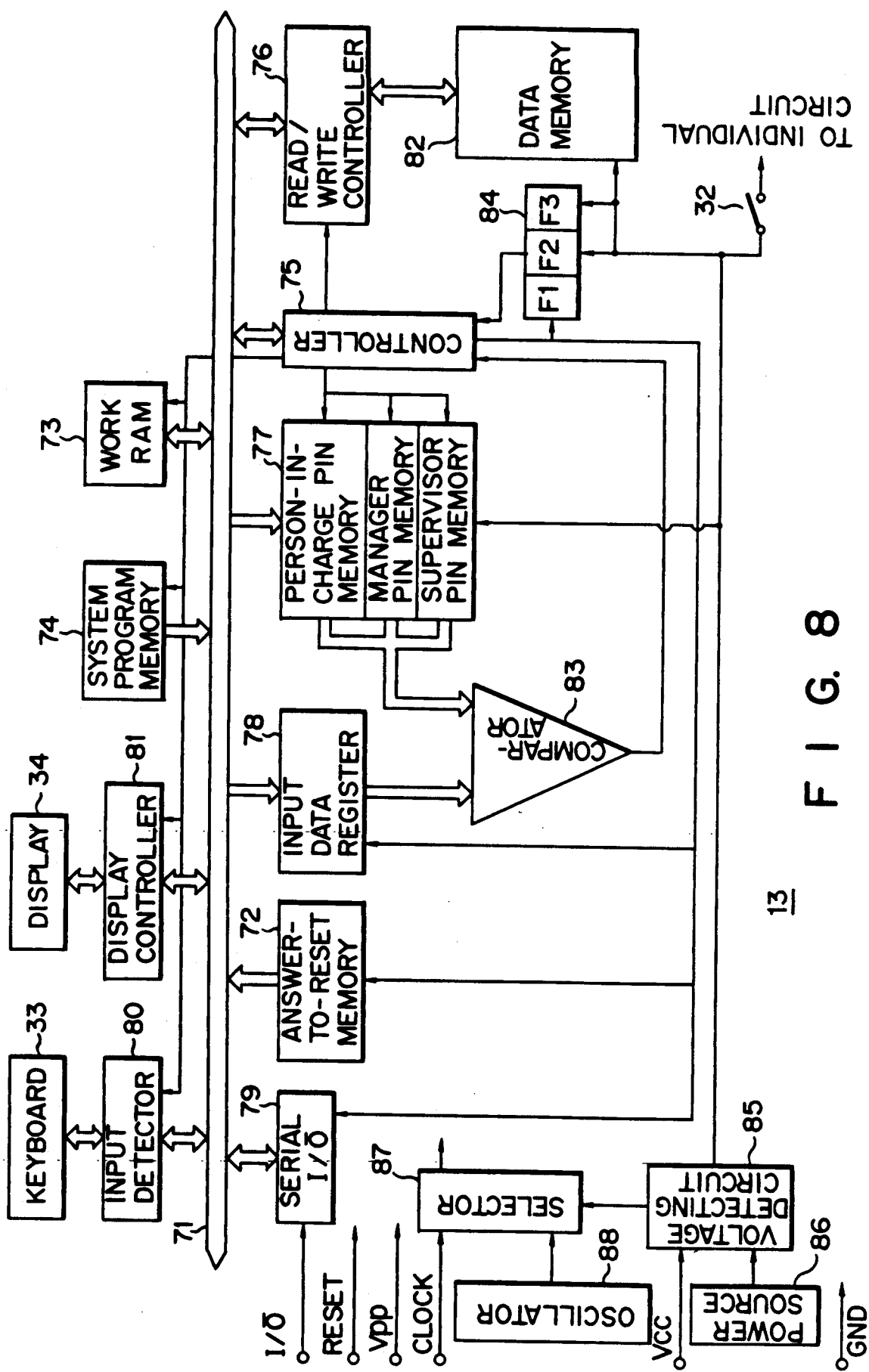
FIG. 8 is a block diagram illustrating the circuit arrangement of the IC card.

FIG. 8 illustrates the circuit arrangement of IC card 13. In the figure, reference numeral 71 is a system bus to which an answer-to-reset memory 72, a work RAM 73, a system program memory 74, a controller 75, a read/write controller 76, a personal identification number (PIN) memory 77, an input data register 78, a serial I/0 79, an input detector 80 and a display controller 81 are coupled.

Answer-to-reset memory 72 stores information on every operation condition for IC card 13 itself (such as data write applied voltage, an allowable current value, the maximum applicable voltage, the maximum data transmission capacity and the maximum response waiting time). When the internal initialization of the IC card itself is completed, the information on these conditions is sent as answer-to-reset data to terminal 14 or 19 based on a predetermined format. Work RAM 73 stores various processing data produced within the IC card 13. System program memory 74 stores various system programs as well as a code signal that represents whether or not the signal from terminal 14 or 19 is correct. Controller 75 sends operational commands to the individual circuits in accordance with reception data supplied through serial I/0 79 and the operational status. Controller 75 also sends a control signal to a flag memory 84, which has a flag F1 associated with a person in charge, a flag F2 associated with a manager and a flag F3 associated with a supervisor. Read/write controller 76 controls data write/read operation of a data memory 82 in response to a command from controller 75. PIN memory 77 stores a person-in-charge PIN, a manager PIN and a supervisor PIN, which are selectively read out in response to a command from controller 75. PIN memory 77 is constituted by an EEP-ROM, for example, so that, if any of the person in charge, manager and supervisor is changed, the content of the corresponding PIN can be corrected accordingly. Input data register 78 temporarily stores data from keyboard 33 and terminal 14 (19). The output of input data register 78 is supplied to a comparator 83 where it is compared with various PINs sent from PIN memory 77. The comparison result from comparator 83 is given to controller 75.

Serial I/0 79 is coupled to data input/output terminal I/0 to perform data transmission with terminal 14 or 19. Input detector 80 supplies a sampling signal to keyboard 33 to detect a key input signal. Display controller 81 performs the display control of display 34.

The IC card 13, when loaded to terminal 14 or 19, is supplied with a reset signal at its reset terminal and a system clock at its clock terminal, and is coupled to a power source Vpp at its Vpp terminal, a power source Vcc at its Vcc terminal and a ground line at its GND terminal.

The voltage Vcc supplied to the Vcc terminal is supplied to a voltage detecting circuit 85 which is coupled to an internal power source 86. Voltage detecting circuit 85 detects power source Vcc by priority when coupled to this power source, and detects internal power source 86 when it is not coupled to power source Vcc and produces an output Vdd. The output from voltage detecting circuit 85 is supplied directly to data memory 82 and flags F2 and F3 of flag memory 84 and is supplied through power switch 32 to the individual circuits of the IC card. With this design, therefore, even when power switch 32 is in the OFF state, the data stored in PIN memory 77 and data memory 82 and the contents of flags F2 and F3 of flag memory 84 can be held. The content of flag F1 is cleared by the OFF operation of power switch 32.

The clock given to the clock terminal is supplied to a selector 87 which is coupled to an oscillator 88. Selector 87 selects either the clock given to the clock terminal or the output of oscillator 88 and sends the selected one to the individual circuits. Here, the oscillation frequency of oscillator 88 is set lower than the clock given to the clock terminal.

The following explains the operation of the embodiment with the above arrangement.

As described earlier with reference to FIG. 1, the IC card application 4 and transfer list 5 which have been prepared by the company 1 are sent to the main bank 2, and IC card 13 is issued based on these materials. In issuing IC card 13, the person-in-charge PIN, manager PIN, and supervisor PIN are stored in the respective sections of PIN memory 77.

Using this IC card 13, data of the remittance list is prepared and approval of the contents of the data is attained, and the data is then transferred to the bank.

Figure 9A:
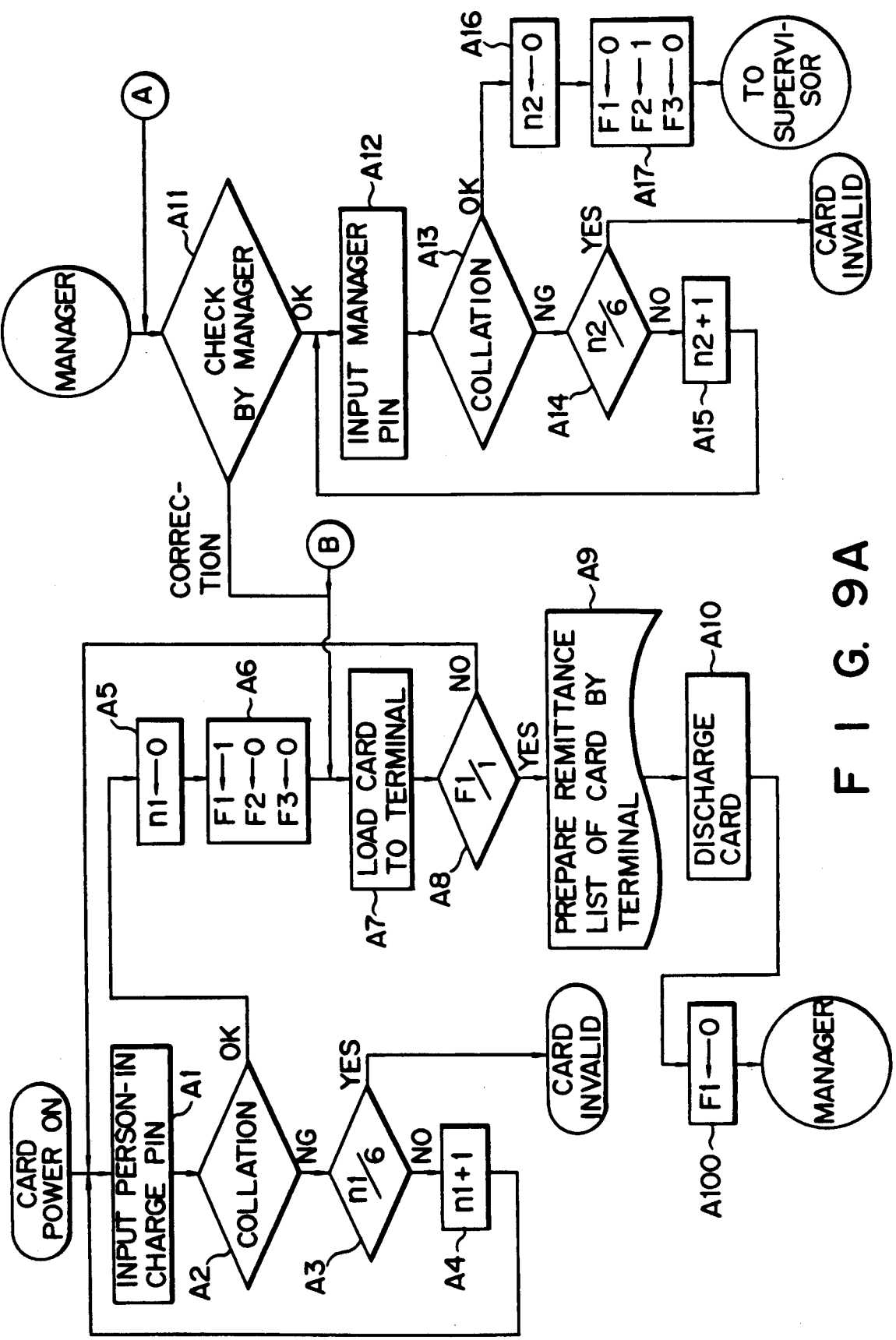
FIGS. 9A and 9B show a flowchart for explaining the operation of the embodiment.
Figure 9B:
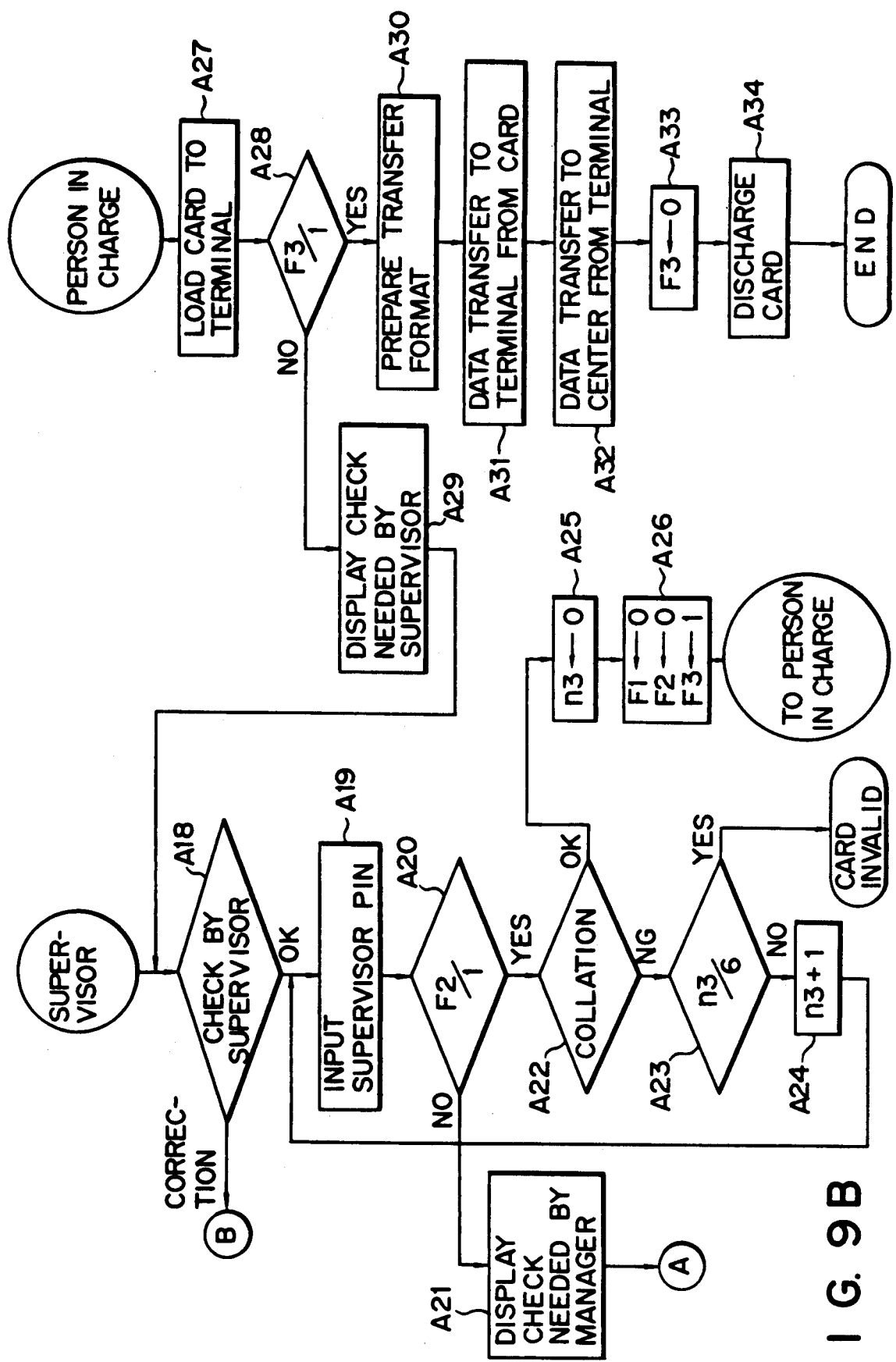

Referring to the flowcharts as shown in FIGS. 9A and 9B, the flow of inputting the remittance data to the IC card and sending this data to the bank will be explained below.

First, when power switch 32 of IC card 13 is operated to power up by a person in charge, who is requested to prepare the remittance list, a predetermined initializing operation is performed in the IC card 13 and it is displayed on display 34 a request to input the PIN of the person in charge in step A1. When the person in charge enters his or her PIN using the numeral keys and the "PERSON-IN-CHARGE PIN" key 33f on keyboard 33 in response to the request, the entered numeral data is supplied through input data register 78 to comparator 83. Meanwhile the person-in-charge PIN is read out from PIN memory 77 and is supplied to comparator 83 in response to the command from controller 75. In the subsequent step A2, comparator 83 collates both of the received data with each other. If the collation result is negative, the process advances to step A3.

In step A3, it is determined whether or not the number, n1, of re-entering of the person-in-charge PIN due to the negative collation result is equal to a predetermined allowable re-entering number (=6). If the re-entering number n1 is smaller than 6, the decision in step A3 is negative (if it is the first input operation, n1 32 0 and the decision is NO), thus advancing to step A4. After the re-entering number n1 is incremented by one and is written in work RAM 73 in step A4, the process then returns to step A1 and the same operation is repeated. On the other hand, if the re-entering number n1 through the repetitive operation becomes equal to or greater than 6, a card invalidation process is performed.

If the collation in step A2 is affirmative, the process advances to step A5 where the re-entering number n1 is set back to "0." In the subsequent step A6, "1" is written in flag F1 of flag memory 84 while "0" is written in flags F2 and F3 in response to the command from controller 75. The process then advances to step A7.

In step A7, IC card 13 is loaded into terminal 14 or 19 by the person in charge. Then, it is determined in the next step A8 whether or not "1" is written in flag F1 of flag memory 84. If the decision in this step is negative, it is considered that the PIN of the person in charge has not been approved and the process returns to step A1. If the decision in step A8 is affirmative, the process advances to step A9 where preparation of the remittance list for IC card 13 is permitted. At the level of the person in charge at this time, data write and read operation to IC card 13 are permitted but data transmission is inhibited, as shown in FIG. 10.

The remittance list under the above situation is prepared by reading out the data necessary for the list preparation from data memory of IC card 13 and then entering the data through keyboard 22 (23) while displaying it on display 24 of terminal 14 or 19. Thus prepared remittance list is written again into data memory 82 of IC card 13.

When the preparation of the remittance list of IC card 13 is completed by the person in change, IC card 13 is discharged from terminal 14 or 19 in step A10. When IC card 13 is discharged, the power from power source Vcc (see FIG. 8) is cut off in IC card 13, causing internal power source 86 to start supplying power to the card, and flag F1 of flag memory 84 is reset by the command signal from controller 75 which has detected the power switching (step A100).

To undergo checking, IC card 13 in which the remittance list has been stored, is given to a manager first. In this case, since IC card 13 is discharged from terminal 14 or 19, as shown in FIG. 10, the manager can access to the card 13 only for data readout but is inhibited to access to the card for data writing and data transmission due to flags F1 and F3 being reset to "0."

The manager checks the contents of the remittance list for the remittance destination, the amount, etc.

The data checking in this case is performed by a key input through keyboard 33 of IC card 13. First, to select data to be checked, a desired number from the registered numbers shown in FIG. 4 is entered and the "REGISTERED NUMBER" key 33a is operated. As a result, data corresponding to the entered number is read out from data memory 82, the registered number is displayed on registered-number display section 341 and data concerned with each item is displayed on data display section 342. At this time, symbol 343 associated with the item is also displayed. The items are sequentially fed using the "→" key for the data checking.

The manager checks all the data by the key operation.

If it is necessary to correct the data, IC card 13 is returned to the person in charge and the correction is instructed.

Consequently, the process returns to step A7 where IC card 13 is loaded into terminal 14 by the person in charge, and then a list for correction is prepared in step A9. In this case, flag F1 of flag memory 84 is cleared so that the process returns to step A1, thus requiring the PIN collation by the person in charge again.

On the other hand, if the data of the remittance list is correct, the decision in step A11 is affirmative (OK) and the manager operates the "MANAGER PIN" key 33e. The process then advances to step A12 where display 34 displays an instruction to enter the PIN of the manager. In response to the instruction, the manager enters his or her own PIN through keyboard 33. That is, the numeral keys and the "MANAGER PIN" key 33e are operated in the named sequence. Then, the input data is supplied through input data register 78 to comparator 83, while the manager PIN is read out from PIN memory 77 and is supplied to comparator 83 in response to the command from controller 75. And in step A13, both PIN data are collated in comparator 83. If they do not coincide with each other, the process advances to step A14.

In step A14, it is determined if the number, n2, of re-entering the manager PIN due to the negative collation result becomes a predetermined allowable re-entering number (=6). If the re-entering number n2 is smaller than 6, the decision in step A14 is negative (if it is the first time the manager PIN is entered, n2=0 and the decision in this step is negative). In the subsequent step A15, the current re-entering number n2 is incremented by one and the result is written in work RAM 73. The process then returns to step A12 and the aforementioned operation is executed. If the re-entering number n2 through the repetitive operation is equal to or greater than 6 in step A14, a card invalidation process is executed.

On the other hand, if the decision in step A13 is affirmative (i.e., the PIN coincidence occurs), the process advances to step A16 where the re-entering number n2 is set back to "0." In the subsequent step A17, "1" is written in flag F2 of flag memory 84 and "0" is written in flags F1 and F3.

To undergo further checking by a supervisor, IC card 13 whose remittance list has already been checked by the manager is given to the supervisor.

The supervisor checks the contents of the remittance list in step A18. In this case, as done by the manager, the list checking is performed by reading out the remittance list, stored in data memory 82, by the key input through key board 33 of IC card 13 and displaying it on display 34. If it is necessary to correct the data, IC card 13 is returned to the person in charge and the correction is instructed.

Consequently, the process returns to step A7 where a list for correction is prepared by the person in charge in the same manner as mentioned above. In this case, flag F1 of flag memory 84 is also cleared so that the process returns to step A1, thus requiring the PIN collation by the person in charge again.

On the other hand, if the data of the remittance list is correct, the decision in step A18 is affirmative (OK) and the supervisor operates the "SUPERVISOR PIN" key 33i. The process then advances to step A19 where display 34 displays an instruction to enter the PIN of the supervisor.

In response to the instruction, the supervisor enters his or her own PIN using the numeral keys and the "SUPERVISOR PIN" key 33i on keyboard 33. Then, in step A20, it is determined whether or not "1" is written in flag F2 of flag memory 84. If the decision here is negative (NO), it is considered that the remittance list has not been checked by the manager and the process advances to step A21 where display 34 indicates that checking by the manager is needed. The IC card 13 is then returned to the manager. On the other hand, if the decision in step 20 is affirmative (YES), the process advances to step A22 where PIN collation is performed.

In this case, the input data from keyboard 33 is supplied through input data register 78 to comparator 83, while the supervisor PIN is read out from PIN memory 77 and is supplied to comparator 83 in response to the command from controller 75. And in step A22, both PIN data are collated in comparator 83. If they do not coincide with each other, the process advances to step A23. In this step A23, it is determined if the number, n3, of re-entering the supervisor PIN due to the negative collation result becomes a predetermined allowable re-entering number (=6). If the re-entering number n3 is smaller than 6, the decision in step A23 is negative (if it is the first time the manager PIN is entered, n2=0 and the decision in this step is negative). In the subsequent step A24, the current re-entering number n3 is incremented by one and the result is written in work RAM 73. The process then returns to step A19 and the aforementioned operation is executed. If the re-entering number n3 through the repetitive operation is equal to or greater than 6 in step A23, a card invalidation process is executed.

On the other hand, if the decision in step A22 is affirmative (i.e., the PIN coincidence occurs), the process advances to step A25 where the re-entering number n3 is set back to "0." In the subsequent step A26, "1" is written in flag F3 of flag memory 84 and "0" is written in flags F1 and F2. At this stage, as shown in FIG. 10, data writing in and data reading from the remittance list written in data memory 82 of IC card 13 are both inhibited and only the data transmission is permitted.

IC card whose remittance list has been checked by the supervisor is returned to the person in charge to send the data to the bank.

In step A27, IC card 13 is loaded into terminal 14 or 19 by the person in charge. In step A28, it is determined whether or not "1" is written in flag F3 of flag memory 84. If the decision here is negative, it is considered that the remittance list has not been checked by the supervisor and the process advances to step A29 where display 34 indicates the necessity of the list checking by the supervisor; no step is taken to perform the data transfer. The IC card 13 is then returned to the supervisor.

On the other hand, if the decision in step A28 is affirmative, the process advances to step A30 where a data transfer format to be read out from the data memory 82 is prepared. As shown in FIG. 11, the format consists of the start code "SRA," block length "BL," class "CLS," command code "COD," status "STS," data and check code "BCC." If checking by the supervisor has been done, the status "STS" is written with, for example, "$00_H 55_H$" (where H indicates a hexadecimal number). As data, the "registered number," "bank number," "branch number," "deposit type," "account number," "receiver name," "transaction number" and "amount" of the remittance list are written in the data format.

Thus formatted readout data is transferred to terminal 14 or 19 from IC card 13 in step A32. In this case, it is determined on the side of terminal 14 or 19 whether or not there is a possibility of data transfer to the bank from the status specified by the status "STS". If "$00_H 55_H$" has been written in the status "STS," the data transfer to the bank is performed in step A32.

Flag F3 of flag memory 84 is set to "0" in the subsequent step A33, and IC card 13 is discharged from terminal 14 or 19 in step A34, thus completing the checking operation.

Accordingly, the contents of the remittance list prepared by the person in charge can be checked by the manager and supervisor who are given with their own PINs so that the list can be reliably checked at the respective stages. The remittance list thus attained would be highly reliable. Further, the multi-checking system can completely prevent alteration of the stored data, thus significantly improving the security in using IC cards.

This invention is not limited to the above embodiment, and may be modified in various manners without departing from the scope and spirit of the invention. For instance, although the remittance list prepared by the person in charge is checked by the manager and the supervisor in the above embodiment, the list may be checked by other persons.

According to this invention, a plurality of PINs are provided in an IC card and access to the internal data can be executed in different levels in accordance with the individual PINs. Therefore, the internal data can be carefully checked to secure highly reliable data. What is more, the multi-checking system can prevent accidental or unauthorized data alteration, thus improving the security in using the cards.

What is claimed is:

1. An IC card system having an IC card and a terminal unit used for processing transaction data generated in association with use of said IC card, said system comprising:

(a) an IC card including:
memory means for storing at least first PIN (personal identification number) data and second PIN data;
input means for entering PIN data;
collation means for comparing PIN data from said input means with said first and second PIN data stored in said memory means to detect coincidence therebetween;
data memory means for storing data inputted from said terminal unit;
first and second storage means for respectively storing first and second permission data each of which represents an allowable operation of said terminal unit;
control means for inputting said first permission data into said first storage means and clearing said second storage means when a coincidence between the first PIN data and the entered PIN data is detected by said collation means, and for inputting said second permission data into said second storage means and clearing said first storage means when a coincidence between the second PIN data and the entered PIN data is detected by said collation means; and (b) a terminal including:
data input means for inputting transaction data into said data memory means of said IC card on condition that said first storage means has the permission data stored in it; and
transferring means for retrieving the stored transaction data from said data memory means of said IC card and transferring the retrieved transaction data to a host computer coupled thereto on condition that said second storage means has the second permission data stored in it.

2. The IC card system according to claim 1, wherein said data memory means includes means for storing transaction data associated with a plurality of transactions.

3. The IC card system according to claim 2, wherein said transaction data stored in said data memory means for each of said plurality of transactions includes at least transaction destination data and transaction amount data used in a firm-banking system.

4. The IC card system according to claim 3, wherein said IC card includes display means for displaying the transaction data stored in said data memory means.

5. The IC card system according to claim 4, wherein said IC card includes means for selecting said stored transaction data corresponding to one of said plurality of transactions.

6. The IC card system according to claim 3, wherein said terminal unit includes display means for displaying data which is entered into said data memory means of said IC card.

7. The IC card system according to claim 3, wherein said input means of the IC card includes:
means for entering a PIN data, as the first PIN data, related to a person who stores transaction data related to a list of transactions in said IC card; and
means for entering a PIN data, as the second PIN data, related to a person who permits transfer of the transaction data stored in said IC card to said host computer.

8. An IC card comprising:
data memory means;
data input/output means for performing a data writing operation to input external data into said data memory means and a sending operation to transfer data stored in said memory means to an external unit;
first PIN memory means for storing a first PIN (personal identification number) data;
second PIN memory means for storing a second PIN data;
PIN input means for inputting a PIN;
PIN comparator means for selectively comparing said input PIN with said first PIN and with said second PIN and, when detecting a coincidence, for outputting a coincidence signal;
first and second flag registers for storing flag data;
control means including:
flag control means for setting a flag in said first flag register and clearing said second flag register when an input PIN coincides with said first PIN, and for setting a flag in said second register when an input PIN coincides with said second PIN; and
permitting means for permitting said data/input output means to perform said data writing operation in response to the flag being set in said first flag register, and to perform said data sending operation in response to the flag of said second flag register being set.

9. In a firm-banking system using an IC card which includes a keyboard and a PIN (personal identification number) comparator therein and a terminal coupled to a host computer, a method for preventing unauthorized alteration of data stored in the IC card, comprising the steps of:
(a) storing in the IC card a first PIN corresponding to a person in charge of writing data into said IC card, and a second PIN corresponding to a person who permits transfer of the data from the IC card;
(b) comparing a PIN entered from said keyboard with the first and second PINs stored in said IC card;
(c) setting a first flag data and resetting a second flag data in said IC card when the entered PIN coincides with the first PIN;
(d) setting the second flag data and resetting the first flag data in said IC card when the entered PIN coincides with the second PIN;
(e) permitting data writing to said IC card on condition that the first flag data is set in said IC card; and
(f) permitting data transfer from said IC card to said host computer on condition that the second flag data is set in said IC card.

10. The method according to claim 9, further comprising the step of writing data into said IC card when said IC card is inserted into said terminal and said person in charge operates a keyboard of said terminal for data writing.

11. The method according to claim 9, further comprising the step of transferring data stored in said IC card to said host computer when said IC card is inserted into said terminal and said terminal detects that the second flag data in said IC card is set.

12. The IC card according to claim 8, wherein said PIN input means is a keyboard provided on said IC card.

13. The IC card according to claim 12, further comprising display means for displaying data stored in said data memory means.

14. The IC card according to claim 8, further comprising a backup battery for causing said first PIN memory means, said second PIN memory means, said data memory means and said second flag register to always hold memory contents.

15. The IC card according to claim 8, wherein data stored in said data memory means includes at least a remittance destination name and a remittance amount used in a firm-banking system.

* * * * *